US011111818B2

(12) United States Patent
McCune et al.

(10) Patent No.: US 11,111,818 B2
(45) Date of Patent: Sep. 7, 2021

(54) FLEXIBLE SUPPORT STRUCTURE FOR A GEARED ARCHITECTURE GAS TURBINE ENGINE

(71) Applicant: RAYTHEON TECHNOLOGIES CORPORATION, Farmington, CT (US)

(72) Inventors: Michael E. McCune, Colchester, CT (US); Jason Husband, South Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 43 days.

(21) Appl. No.: 16/667,154

(22) Filed: Oct. 29, 2019

(65) Prior Publication Data

US 2020/0232342 A1    Jul. 23, 2020

Related U.S. Application Data

(63) Continuation of application No. 16/125,179, filed on Sep. 7, 2018, now Pat. No. 10,590,802, which is a
(Continued)

(51) Int. Cl.
*F01D 25/16* (2006.01)
*F02C 7/32* (2006.01)
(Continued)

(52) U.S. Cl.
CPC .............. *F01D 25/164* (2013.01); *F01D 5/06* (2013.01); *F01D 9/02* (2013.01); *F01D 15/12* (2013.01);
(Continued)

(58) Field of Classification Search
None
See application file for complete search history.

(56) References Cited

U.S. PATENT DOCUMENTS

| 2,258,792 A | 4/1941 | New |
| 2,936,655 A | 5/1960 | Peterson et al. |
| (Continued) | | |

FOREIGN PATENT DOCUMENTS

| CA | 2789325 | 4/2013 |
| CA | 2789465 | 4/2013 |
| (Continued) | | |

OTHER PUBLICATIONS

Winn, A. (Ed). (1990). Wide Chord Fan Club. Flight International, 4217(137). May 23-29, 1990. pp. 34-38.
(Continued)

*Primary Examiner* — Juan G Flores
(74) *Attorney, Agent, or Firm* — Carlson, Gaskey & Olds, P.C.

(57) ABSTRACT

A gas turbine engine includes a fan shaft that drives a fan that has fan blades. An outer housing surrounds the fan. A bypass flow path is within the outer housing. A fan shaft support that supports the fan shaft defines a fan shaft support transverse stiffness. A gear system is connected to the fan shaft. The gear system includes a gear mesh that defines a gear mesh transverse stiffness. A flexible support which supports the gear system relative to a static structure defines a flexible support transverse stiffness. The flexible support transverse stiffness is less than 11% of the fan shaft support transverse stiffness. The flexible support transverse stiffness is less than 8% of the gear mesh transverse stiffness.

28 Claims, 9 Drawing Sheets

Related U.S. Application Data continuation of application No. 15/606,494, filed on May 26, 2017, now Pat. No. 10,227,893, which is a continuation of application No. 14/859,381, filed on Sep. 21, 2015, now Pat. No. 10,301,968, which is a continuation of application No. 14/604,811, filed on Jan. 26, 2015, now Pat. No. 9,239,012, which is a continuation-in-part of application No. 13/623,309, filed on Sep. 20, 2012, now Pat. No. 9,133,729, which is a continuation-in-part of application No. 13/342,508, filed on Jan. 3, 2012, now Pat. No. 8,297,916.

(60) Provisional application No. 61/494,453, filed on Jun. 8, 2011.

(51) Int. Cl.

| | | |
|---|---|---|
| *F02C 7/36* | (2006.01) | |
| *F01D 15/12* | (2006.01) | |
| *F01D 25/28* | (2006.01) | |
| *F01D 5/06* | (2006.01) | |
| *F01D 9/02* | (2006.01) | |
| *F02K 3/06* | (2006.01) | |
| *F04D 25/04* | (2006.01) | |
| *F04D 29/053* | (2006.01) | |
| *F04D 29/32* | (2006.01) | |
| *F04D 19/02* | (2006.01) | |
| *F04D 29/056* | (2006.01) | |

(52) U.S. Cl.
CPC .............. *F01D 25/16* (2013.01); *F01D 25/28* (2013.01); *F02C 7/32* (2013.01); *F02C 7/36* (2013.01); *F02K 3/06* (2013.01); *F04D 19/02* (2013.01); *F04D 25/045* (2013.01); *F04D 29/053* (2013.01); *F04D 29/056* (2013.01); *F04D 29/321* (2013.01); *F04D 29/325* (2013.01); *F05D 2220/32* (2013.01); *F05D 2240/60* (2013.01); *F05D 2260/40311* (2013.01); *F05D 2260/96* (2013.01); *Y02T 50/60* (2013.01); *Y10T 29/49321* (2015.01)

(56) References Cited

U.S. PATENT DOCUMENTS

| | | |
|---|---|---|
| 3,021,731 A | 2/1962 | Stoeckicht |
| 3,194,487 A | 7/1965 | Tyler et al. |
| 3,287,906 A | 11/1966 | McCormick |
| 3,352,178 A | 11/1967 | Lindgren et al. |
| 3,412,560 A | 11/1968 | Gaubatz |
| 3,664,612 A | 5/1972 | Skidmore et al. |
| 3,747,343 A | 7/1973 | Rosen |
| 3,754,484 A | 8/1973 | Roberts |
| 3,765,623 A | 10/1973 | Donelson |
| 3,820,719 A | 6/1974 | Clark |
| 3,843,277 A | 10/1974 | Ehrich |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,084,861 A | 4/1978 | Greenberg et al. |
| 4,090,416 A | 5/1978 | Hicks |
| 4,130,872 A | 12/1978 | Harloff |
| 4,201,513 A | 5/1980 | Sales |
| 4,220,171 A | 9/1980 | Ruehr |
| 4,240,250 A | 12/1980 | Harris |
| 4,275,557 A | 6/1981 | Marvin et al. |
| 4,284,174 A | 8/1981 | Salvana et al. |
| 4,289,360 A | 9/1981 | Zirin |
| 4,478,551 A | 10/1984 | Honeycutt, Jr. et al. |
| 4,649,114 A | 3/1987 | Miltenburger et al. |
| 4,696,156 A | 9/1987 | Burr et al. |
| 4,722,357 A | 2/1988 | Wynosky |
| 4,825,723 A | 5/1989 | Martin |
| 4,979,362 A | 12/1990 | Vershure, Jr. |
| 5,058,617 A | 10/1991 | Stockman et al. |
| 5,102,379 A | 4/1992 | Pagluica et al. |
| 5,141,400 A | 8/1992 | Murphy et al. |
| 5,317,877 A | 6/1994 | Stuart |
| 5,361,580 A | 11/1994 | Ciokajlo et al. |
| 5,433,674 A * | 7/1995 | Sheridan .................. F01D 5/02 475/346 |
| 5,447,411 A | 9/1995 | Curley et al. |
| 5,466,198 A | 11/1995 | McKibbin et al. |
| 5,524,847 A | 6/1996 | Brodell et al. |
| 5,634,767 A | 6/1997 | Dawson |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,073,439 A | 6/2000 | Beaven et al. |
| 6,223,616 B1 | 5/2001 | Sheridan |
| 6,260,351 B1 | 7/2001 | Delano et al. |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,517,341 B1 | 2/2003 | Brun et al. |
| 6,607,165 B1 | 8/2003 | Manteiga et al. |
| 6,663,530 B2 | 12/2003 | Poulin et al. |
| 6,709,492 B1 | 3/2004 | Spadaccini et al. |
| 6,735,954 B2 | 5/2004 | MacFarlane et al. |
| 6,814,541 B2 | 11/2004 | Evans et al. |
| 6,855,089 B2 | 2/2005 | Poulin et al. |
| 6,883,303 B1 | 4/2005 | Seda |
| 6,895,741 B2 | 5/2005 | Rago et al. |
| 7,021,042 B2 | 4/2006 | Law |
| 7,104,918 B2 | 9/2006 | Mitrovic |
| 7,144,349 B2 | 12/2006 | Mitrovic |
| 7,219,490 B2 | 1/2007 | Dev |
| 7,223,197 B2 | 5/2007 | Poulin et al. |
| 7,328,580 B2 | 2/2008 | Lee et al. |
| 7,374,403 B2 | 5/2008 | Decker et al. |
| 7,393,182 B2 | 7/2008 | Matheny |
| 7,451,592 B2 | 11/2008 | Taylor et al. |
| 7,591,754 B2 | 9/2009 | Duong et al. |
| 7,631,484 B2 | 12/2009 | Giffin et al. |
| 7,632,064 B2 | 12/2009 | Somanath |
| 7,662,059 B2 | 2/2010 | McCune |
| 7,665,293 B2 | 2/2010 | Wilson, Jr. et al. |
| 7,704,178 B2 | 4/2010 | Sheridan et al. |
| 7,806,651 B2 | 10/2010 | Kennepohl et al. |
| 7,824,305 B2 | 11/2010 | Duong et al. |
| 7,828,682 B2 | 11/2010 | Smook |
| 7,841,163 B2 | 11/2010 | Welch et al. |
| 7,841,165 B2 | 11/2010 | Orlando et al. |
| 7,926,260 B2 | 4/2011 | Sheridan et al. |
| 7,959,532 B2 | 6/2011 | Suciu et al. |
| 7,997,868 B1 | 8/2011 | Liang et al. |
| 8,001,763 B2 | 8/2011 | Grabowski et al. |
| 8,172,717 B2 | 5/2012 | Lopez et al. |
| 8,205,432 B2 | 6/2012 | Sheridan |
| 8,297,916 B1 | 10/2012 | McCune |
| 8,640,336 B2 | 2/2014 | Sheridan et al. |
| 9,239,012 B2 * | 1/2016 | McCune .................. F02C 7/32 |
| 9,523,422 B2 | 12/2016 | McCune et al. |
| 9,752,511 B2 | 9/2017 | McCune et al. |
| 10,301,968 B2 | 5/2019 | McCune et al. |
| 10,590,802 B2 * | 3/2020 | McCune ............... F04D 29/053 |
| 2006/0228206 A1 | 10/2006 | Decker et al. |
| 2007/0214795 A1 | 9/2007 | Cooker et al. |
| 2008/0003096 A1 | 1/2008 | Kohli et al. |
| 2008/0044276 A1 | 2/2008 | McCune |
| 2008/0098713 A1 | 5/2008 | Orlando et al. |
| 2008/0098718 A1 | 5/2008 | Henry |
| 2008/0116009 A1 | 5/2008 | Sheridan et al. |
| 2008/0317588 A1 | 12/2008 | Grabowski et al. |
| 2009/0056343 A1 | 3/2009 | Suciu et al. |
| 2009/0074565 A1 | 3/2009 | Suciu et al. |
| 2009/0090096 A1 | 4/2009 | Sheridan |
| 2009/0145102 A1 | 6/2009 | Roberge et al. |

(56) References Cited

U.S. PATENT DOCUMENTS

| | | | |
|---|---|---|---|
| 2009/0314881 | A1 | 12/2009 | Suciu et al. |
| 2010/0105516 | A1* | 4/2010 | Sheridan ................ F01D 25/18 475/346 |
| 2010/0132376 | A1 | 6/2010 | Durocher et al. |
| 2010/0148396 | A1 | 6/2010 | Xie et al. |
| 2010/0212281 | A1 | 8/2010 | Sheridan |
| 2010/0218483 | A1 | 9/2010 | Smith |
| 2010/0331139 | A1 | 12/2010 | McCune |
| 2011/0106510 | A1 | 5/2011 | Poon |
| 2011/0116510 | A1 | 5/2011 | Breslin et al. |
| 2011/0130246 | A1 | 6/2011 | McCune et al. |
| 2011/0159797 | A1 | 6/2011 | Beltman et al. |
| 2011/0165983 | A1 | 7/2011 | Fox |
| 2011/0208400 | A1 | 8/2011 | Lickfold et al. |
| 2011/0286836 | A1 | 11/2011 | Davis |
| 2011/0293423 | A1 | 12/2011 | Bunker et al. |
| 2012/0124964 | A1 | 5/2012 | Hasel et al. |
| 2013/0219913 | A1 | 8/2013 | McCune et al. |
| 2013/0224003 | A1 | 8/2013 | Kupratis et al. |
| 2013/0259650 | A1 | 10/2013 | Schwarz |
| 2013/0287575 | A1 | 10/2013 | McCune et al. |
| 2013/0331224 | A1 | 12/2013 | McCune et al. |
| 2014/0133958 | A1 | 5/2014 | McCune et al. |
| 2014/0140819 | A1 | 5/2014 | McCune et al. |
| 2014/0174056 | A1 | 6/2014 | Suciu et al. |

FOREIGN PATENT DOCUMENTS

| | | |
|---|---|---|
| EP | 0253548 | 1/1988 |
| EP | D791383 | 8/1997 |
| EP | 1142850 | 10/2001 |
| EP | 2270361 | 1/2011 |
| EP | 2532841 A2 | 12/2012 |
| EP | 2551488 | 1/2013 |
| EP | 2551488 | 10/2013 |
| GB | 1516041 | 6/1978 |
| GB | 2041090 | 9/1980 |
| GB | 2426792 | 12/2006 |
| WO | 2007038674 | 4/2007 |
| WO | 2013154636 | 10/2013 |
| WO | 2014047040 A1 | 3/2014 |
| WO | 2015156885 | 10/2015 |

OTHER PUBLICATIONS

Parker, R.G. and Lin, J. (2001). Modeling, modal properties, and mesh stiffness variation instabilities of planetary gears. Prepared for NASA. NASA/CR-2001-210939. May 2001. pp. 1-111.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Dudley, D.W., Ed. (1954). Handbook of practical gear design. Lancaster, PA: Technomic Publishing Company, Inc. pp. 3.96-102 and 8.12-18.

Dudley, D.W., Ed. (1962). Gear handbook. New York, NY: McGraw-Hill. pp. 3.14-18 and 12.7-12.21.

Dudley, D.W., Ed. (1994). Practical gear design. New York, NY: McGraw-Hill. pp. 119-124.

Product Brochure. Garrett TFE731. Allied Signal. Copyright 1987. pp. 1-24.

Honeywell Learjet 31 and 35/36 TFE731-2 to 2C Engine Upgrade Program. Sep. 2005. pp. 1-4.

Honeywell Sabreliner 65 TFE731-3 to-3D Engine Upgrade Program. Oct. 2005. pp. 1-4.

U.S. Department of Transportation: Federal Aviation Administration Type Certificate Data Sheet No. E6WE. Dated: May 9, 2000. p. 1-.

Kurzke, J. (2012). GasTurb 12: Design and off-design performance of gas turbines. Retrieved from: https://www.scribd.com/document/153900429/GasTurb-12.

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.

Riegler, C., and Bichlmaier, C. (2007). The geared turbofan technology—Opportunities, challenges and readiness status. Porceedings CEAS. Sep. 10-13, 2007. Berlin, Germany. pp. 1-12.

About GasTurb. Retrieved Jun. 26, 2018 from: http://gasturb.de/about-gasturb.html.

Kurzke, J. (2001). GasTurb 9: A porgram to calculate design and off-design performance of gas turbines. Retrieved from: https://www.scribd.com/document/92384867/GasTurb9Manual.

Tummers, B. (2006). DataThief III. Retreived from: https://datathief.org/DatathiefManual.pdf pp. 1-52.

Manual. Student's Guide to Learning SolidWorks Software. Dassault Systemes—SolidWorks Corporation. pp. 1-156.

Macisaac, B. and Langston, R. (2011). Gas turbine propulsion systems. Chichester, West Sussex: John Wiley & Sons, Ltd. pp. 260-265.

Datasheet. CFM56-5B for the Airbus A320ceo family and CFM56-7B for the Boeing 737 family. https://www.cfmaeroengines.com/.

Turner, M. G., Norris, A., and Veres, J.P. (2004). High-fidelity three-dimensional simulation of the GE90. NASA/TM-2004-212981. pp. 1-18.

Defeo, A. and Kulina, M. (1977). Quiet clean short-haul experimental engine (QCSEE) main reduction gears detailed design final report. Prepared for NASA. NASA-CR-134872. Jul. 1977. pp. 1-221.

Amezketa, M., Iriarte, X., Ros, J., and Pintor, J. (2009). Dynamic model of a helical gear pair with backlash and angleOvarying mesh stiffness. Multibody Dynamics 2009, ECCOMAS Thematic Conference. 2009. pp. 1-36.

Singh, A. (2005). Application of a system level model to study the planetary load sharing behavior. Jounal of Mechanical Design. vol. 127. May 2005. pp. 469-476.

Smith-Boyd, L. and Pike, J. (1986). Expansion of epicyclic gear dynamic analysis program. Prepared for NASA. NASA CR-179563. Aug. 1986. pp. 1-98.

Wikipedia. Torsion spring. Retreived Jun. 29, 2018 from: https://en.wikipedia.org/wiki/Torsion_spring.

Agma Standard (2006). Design manual for enclosed epicyclic gear drives. Alexandria, VA: American Gear Manufacturers Association. pp. 1-104.

Agma Standard (1997). Design and selection of components for enclosed gear drives. lexandria, VA: American Gear Manufacturers Association. pp. 1-48.

Daly, M. Ed. (2007). Jane's Aero-Engine. Issue Twenty-three. Mar. 2008. p. 707-712.

Agma Standard (1999). Flexible couplings—Mass elastic properties and other characteristics. Alexandria, VA: American Gear Manufacturers Association. pp. 1-46.

Wikipedia. Stiffness. Retrieved Jun. 28, 2018 from: https://en.wikipedia.org/wiki/Stiffness.

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

(56) References Cited

OTHER PUBLICATIONS

Gray, D.E. and Gardner, W.B. (1983). Energy efficient engine program technology benefit/cost study—vol. 2. NASA CR-174766. Oct. 1983. pp. 1-118.

Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.

Groweneweg, J.F. (1994). Fan noise research at NASA. Noise-CON 94. Fort Lauderdale, FL. May 1-4, 1994. pp. 1-10.

Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.

Howe, D.C., and Wynosky, T.A. (1985). Energy efficient engine program advanced turbofan nacelle definition study. NASA-CR-174942. May 1985. pp 1-60.

Howe, D.C., and Wynosky, T.A. (1985). Energy efficient engine program advanced turbofan nacelle definition study. NASA-CR-174942. May 1985. University of Washington dated Dec. 13, 1990. pp. 1-14.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.

Mattingly, J.D. (1996). Elements of gas turbine propulsion. New York, New York: McGraw-Hill, Inc. pp. 1-18, 60-62, 223-234, 462-479, 517-520, 757-767, and 862-864.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill. pp. 87-153.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 722-726 and 764-771.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/docment/aviation_tech_review.pdf.

Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.

Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Technical Data. Teflon. WS Hampshire Inc. Retrieved from: http://catalog.wshampshire.com/Asset/psg_teflon_ptfe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Edkins, D.P., Hirschkron, R., and Lee, R. (1972). TF34 turbofan quiet engine study. Final Report prepared for NASA. NASA-CR-120914. Jan. 1, 1972. pp. 1-99.

Waters, M.H. and Schairer, E.T. (1977). Analysis of turbofan propulsion system weight and dimensions. NASA Technical Memorandum. Jan. 1977. pp. 1-65.

Meyer, A.G. (1988). Transmission development of TEXTRON Lycoming's geared fan engine. Technical Paper. Oct. 1988. pp. 1-12.

Dudley, D.W., Ed. (1962). Gear handbook. New York, NY: McGraw-Hill. pp. 14-17 (TOC, Preface, and Index).

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

Mccune, M.E. (1993). Initial test results of 40,000 horsepower fan drive gear system for advanced ducted propulsion systems. AIAA 29th Joint Conference and Exhibit. Jun. 28-30, 1993. pp. 1-10.

(56) References Cited

OTHER PUBLICATIONS

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Mcardle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retreived from https://geaviation.com/sites/default/files/datasheet-CF6-80C2.pdf.
Salemme, C.T. and Murphy, G.C. (1979). Metal spar/superhybrid shell composite fan blades. Prepared for NASA. NASA-CR-159594. Aug. 1979. pp. 1-127.
"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx™ high bypass turbofan engines. Retreived from: https://www.geaviation.com/sites/default/files/datasheet-genx.pdf.
Third Party Observations for European Patent Application No. 16174051.9 Publication No. 3098396 filed Jun. 26, 2018. Mailed Jul. 9, 2018.
Mcmillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009. Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the Interna-

(56) References Cited

OTHER PUBLICATIONS tional Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Peter Lynwander of American Lohmann Corporation, New Jersey, "Gear Drive Systems: Design and Application", 1983 Marcel Dekker Inc. NY and Basel, GE-1018.008 PP. (year 1983).
EP Search Report for EP Application No. 18191333.6 dated Mar. 7, 2019.
EP Search Report for EP Application No. 18191325.2 dated Mar. 7, 2019.
Munt, R. (1981). Aircraft technology assessment: Progress in low emissions engine. Technical Report. May 1981. pp. 1-171.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Aug. 17, 2016.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to—5BR Engine Conversion Program. Sep. 2005. pp. 1-4.

Garret TFE731 Turbofan Engine (CAT C). Chapter 79: Lubrciation System. TTFE731 Issue 2. 2010. pp. 1-24.
Mcardle, J.G. (1979). Static test-stand performance of the YF-102 turbofan engine with several exhaust configurations for the quiet short-haul research aircraft (QSRA). Nasa Technical Paper. Nov. 1979. pp. 1-68.
Abhijit Guha, "Optimum Fan Pressure Ratio for Bypass Engines with Separate or Mixed Exhaust Streams", Sep.-Oct. 2001, Journal of Propulsion and Power 17(5), p. 1117-1122.
Type Certificate Data Sheet A23WE, Department of Transportation Federal Aviation Administration, Oct. 25, 2001, pp. 1-23.
Unicom, Flying Magazine, Nov. 2002, vol. 129, No. 11, p. 68.
Adams, Eric. (2016) The World's Hugest Jet Engine Is Wider Than A 737s Fuselage. Apr. 28, 2016. www.wired.com/2016/04/worlds-hugest-jet-engine-wider-737s-fuselage/ accessed on Apr. 28, 2016).
Robert G. Parker and Jian Lin, "Modeling, Modal Properties, and Mesh Stiffness Variation Instabilities of Planetary Gears", May 2001, NASA Glenn Research Center, CR-2001-210939, ARL-CL-462.
Oscar Van Deventer, "Extreme Reduction—11 million to one gearing", Shapeways.com, accessed on Nov. 13, 2017, https://www.shapeways.com/product/EQJQZEVWU/extreme-reduction-11-million-to-one-gearing.
Kapelevich, "High Gear Ratio Epicyclic Drives Analysis", Jun. 2014, American Gear Manufacturers Association, geartechnology.com, pp. 62-67.
D6—Preliminary opinion of the opposition division issued in the framework of the opposition procedure against patent EP 2 949 882 (Application No. 15175205.2).
D7—Preliminary opinion of the opposition division issued in the framework of the opposition procedure against patent EP 3 051 078 (Application No. 16155413.4).
D8—Preliminary opinion of the opposition division issued in the framework of the opposition procedure against patent EP 2 949 881 (Application No. 15175203.7).
D9—Annex to communication 94(3) EPC—patent EP 3 296 526—Feb. 1, 2019 ( Application No. 17199484.1).
D10—Annex to communication 94(3) EPC—EP 3 296 526—Feb. 27, 2020 ( Application No. 17199484.1).
D11—Article Amezketa, Miguel, "Dynamical Model of Helical Gear pair with backlash and angle-varying mesh stiffness" Multibody Dynamics 2009, ECCOMAS Thematic Conference.
Foreign copy and English Translation on the back of Opposition to European Patent No. EP3097275 granted Sep. 25, 2019 filed on behalf of Safran Aircraft Engines dated Jul. 1, 2020.
D12—Priority document U.S. Appl. No. 14/160,601 dated Jan. 22, 2014.
EP Extended Search Report from EP Application No. 19199343.5 Jan. 10, 2020.
Princeton, "Composite Materials", https://www.princeton.edu/-humcomp/bikes/design/desi_30.htm, on Oct. 9, 2019 (Year: 2019).
Power Technology, "GE's H-Series Breaks 60% Fuel Efficiency Barrier", 2007, retrieved from https://www.power-technology.com/features/feature1084/ (Year: 2007).
Team CCJ, "Turbine blade, vane cooling—a primer", 2018, https://www.ccj-online.com/turbine-blade-vane-cooling-a-primer/ retrieved on Oct. 9, 2019 (Year: 2018).
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.

(56) References Cited

OTHER PUBLICATIONS

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 3-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., Macmartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of a C/SiC composites with Si—MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystal-line silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
Third Party Observations of European Patent Application No. 18191333.6 (EP 3467273) dated Mar. 9, 2020 by Rolls Royce.
Third Party Observations of European Patent Application No. 18191325.2 (EP 3608515) dated Mar. 10, 2020 by Rolls Royce.
Third Party Observations of European Patent Application No. 18191325.2 (EP 3608515) dated Mar. 6, 2020 by Rolls Royce.
Third Party Observations of European Patent Application No. 17199484.1 (EP 3296526) ) dated Oct. 30, 20190 by Rolls Royce.

(56) References Cited

OTHER PUBLICATIONS

Reynolds, C.N. (1985). Advanced prop-fan engine technology (APET) single- and counter-rotation gearbox/pitch change mechanism. Prepared for NASA. NASA CR-168114 (vol. II). Jul. 1985. pp. 1-175.
U.S. Department of Transportation: Federal Aviation Administration Type Certificate Data Sheet No. E6WE. Dated: May 9, 2000. p. 1-9.
English Translation of Notice of Opposition to Patent No. EP2811120. United Technologies Corporation opposed by Rolls Royce. Issued on Apr. 12, 2018.
English translation of Measurement and calculation methodology on TFE731-2, TFE731-3A and TFE731-3D models.
English translation of Expert certificate concerning the technical nature of the drawings used in the measurement and calculation methodology.
Declaration of Raymond Drago. In re U.S. Pat. No. 8,297,916. IPR2018-01172. Executed May 29, 2018. pp. 1-115.
Declaration of Courtney H. Bailey. In re U.S. Pat. No. 8,511,605. Executed Jul. 19, 2016. pp. 1-4.
Daly, M. and Gunston, B. (2008). Jane's Aero-Engines. Pratt & Whitney PW8000. Issue Twenty-three.
Petition for Inter Partes Review of U.S. Pat. No. 8,297,916. *General Electric Company*, Petitioner, v. *United Technologies Corporation*, Patent Owner. IPR2018-01171. Filed May 30, 2018.
Petition for Inter Partes Review of U.S. Pat. No. 8,297,916. *General Electric Company*, Petitioner, v. *United Technologies Corporation*, Patent Owner. IPR2018-01172. Filed May 30, 2018.
English Translation of Notice of Opposition to Patent No. EP2949882. United Technologies Corporation opposed by Rolls Royce. Mailed Aug. 23, 2017.
English Translation of Notice of Opposition to Patent No. EP2811120. United Technologies Corporation opposed by Safran Aircraft Engines. Mailed Jul. 12, 2017.
English Translation of Notice of Opposition to Patent No. EP299882. United Technologies Corporation opposed by Safran Aircraft Engines. Mailed May 23, 2018.
International Search Report and Written Opinion for International Application No. PCT/US2013/060105 completed on Jan. 30, 2014.
International Preliminary Report on Patentability for International Application No. PCT/US2015/012346 dated Aug. 4, 2016.
NASA, Engine Weight Model, Glenn Research Center, retrieved from, http://www.grc.nasa.gov/WWW/K-12/airplane/turbwt.html, Mar. 11, 2016.
International Preliminary Report on Patentability for International Application No. PCT/US2013/060105 dated Apr. 2, 2015.
Declaration of Magdy Attia in re U.S. Pat. No. 8,899,915. Executed Dec. 13, 2016. pp. 1-71.
Declaration of Raymond Drago. In re U.S. Pat. No. 8,899,915. Executed Dec. 9, 2016. pp. 1-38.
Petition for Inter Partes Review of U.S. Pat. No. 8,899,915. *General Electric Company*, Petitioner, v. *United Technologies Corporation*, Patent Owner. Filed Dec. 21, 2016.
Grzegroz, L. and Friswell, M. Dynamics of a gear system with faults in meshing stiffness. Nonlinear Dynamics (2005)41. pp. 415-421.
European Search Report for European Patent Application No. 16174051 completed Oct. 21, 2016.
Extended European Search Report for European Application No. 16155413.4 dated Jun. 23, 2016.
Rauch, Dale, "Design Study of an Air Pump and Integral Lift Engine ALF-504 Using the Lycoming 502 Core," NASA Report CR-120992, Jul. 31, 1972.
European Search Report for European Application No. 16152821.1 completed Jun. 16, 2016.
Litak, G. and Friswell, M.I. (2004). Dynamics of a gear system with faults in meshing stiffness. Nonlinear Dynamics (2005) 41: 415-421.
European Search Report for European Patent Application No. 16159312.4 completed Jun. 8, 2016.
European Search Report for European Patent Application No. 15175203.7 dated Oct. 15, 2015.
European Search Report for European Patent Application No. 15175205.2 dated Oct. 15, 2015.
European Search Report for European Patent Application No. 12170479.5 completed on Jun. 26, 2014.
European Search Report for European Patent Application No. 12170483.7 completed Apr. 29, 2014.
Third Party Observations and Concise Description of Relevance of Document for U.S. Appl. No. 15/816,487 mailed Jul. 25, 2018.
U.S. Appl. No. 61/494,453, filed Jun. 8, 2011 titled Geared Engine Flexible Mount Arrangement.
Third Party Observations and Concise Description of Relevance of Document for U.S. Appl. No. 15/856,396 mailed Aug. 31, 2018.
*Dr. Raymond G. Tronzo v. Biomet Inc.*, 156 F.3d 1154 (1998).
Third Party Observations and Concise Description of Relevance of Document for U.S. Appl. No. 15/881,240 mailed Aug. 31, 2018.
Third Party Observations and Concise Description of Relevance of Document for U.S. Appl. No. 15/185,292 mailed Jul. 5, 2018.
Decision to Deny Institution—Case IPR2018-01172, U.S. Pat. No. 8,297,916 B1. *General Electric Company*, Petitioner, v. *United Technologies Corporation*, Patent owner. Entered Nov. 29, 2018.
Decision to Deny Institution—Case IPR2018-01171, U.S. Pat. No. 8,297,916 B1. *General Electric Company*, Petitioner, v. *United Technologies Corporation*, Patent owner. Entered Nov. 29, 2018.
Response to Observations by Patantee filed by Rolls Royce on Jan. 18,2019 for European Patent No. EP2532858B1 granted Oct. 19, 2016.
Response to Observations by Patantee filed by Rolls Royce on Jul. 18, 2018 for European Patent No. EP2737180B1 granted Apr. 13, 2016.
Response to Observations by Patantee filed by Rolls Royce on Jul. 18, 2018 for European Patent No. EP2532841B1 granted Apr. 27, 2016.
EP Office Action for European Application No. 16174051.9 dated Oct. 15, 2018.
EP Office Action for European Application No. 17199484.1 dated Jan. 2, 2019.
EP Office Action for European Application No. 16159312.4 dated Oct. 16, 2018.
Third Party Observations for European Patent Application No. 16159312.4 filed Jun. 22, 2018. Mailed Jul. 3, 2018.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Wikipedia. Torsion spring. Retrieved Jun. 29, 2018 from: https://en.wikipedia.org/wiki/Torsion_spring.
AGMA Standard (1997). Design and selection of components for enclosed gear drives. Alexandria, VA: American Gear Manufacturers Association. pp. 1-48.
Third Party Observations for European Patent Application No. 11250208.3 filed Jul. 20, 2018. Mailed Jul. 26, 2018.
Third Party Observations for European Patent Application No. 17199484.1 filed Jul. 5, 2018. Mailed Jul. 12, 2018.
Third Party Observations for European Patent Application No. 13775188.9 filed Sep. 10, 2018. Mailed Sep. 17, 2018.
Notice of Opposition for European Patent No. 3051078 filed Jul. 31, 2018.
Optimised Gearbox Design for Modern Wind Turbines. Hicks, Cunliffe and Gifer; Nov. 20, 20014.
ANSI-AGMA 9004-A99 Flexible Couplings—Mass Elastic Properties and Other Characteristics.AGMA Standard. Approved Aug. 3, 1999.
ANSI-AGMA 6123-B06—IDesign Manual for Enclosed Epicyclic Gear Drives—AGMA Standard. Approved Sep. 20, 2006.
ANSI-AGMA 940-A09—Double Helical Epicyclic Gear Units. AGMA Information Sheet. Approved Jan. 6, 2009.
Youtube video; "PurePower PW1000G Engine: Customer Testimonials", published Jul. 26, 2010 (~seconds 43-63) available at https:www.youtube.com/watch?v=vgQgEftEd8c on Aug. 9, 2018.
Request for Opinion filed by Rolls Royce on Jul. 11, 2018 for European Patent No. EP2532858B1 granted Oct. 19, 2016.
Request for Opinion filed by Rolls Royce on Jul. 11, 2018 for European Patent No. EP2737180B1 granted Apr. 13, 2016.

(56) References Cited

OTHER PUBLICATIONS

Request for Opinion filed by Rolls Royce on Jul. 11, 2018 for European Patent No. EP2532841B1 granted Apr. 27, 2016.
Brief communication for EP Application No. 15175203.7 (U.S. Pat. No. 2,949,881) Opposition Proceedings Rolls Royce Mar. 25, 2021.
Brief communication for EP Application No. 15175203.7. (U.S. Pat. No. 2,949,881) Opposition Proceedings Safran English Translation Apr. 5, 2021.
Brief communication for EP Application No. 15175203.7. (U.S. Pat. No. 2,949,881) Opposition Proceedings Safran in French. Mar. 25, 2021.
Appeal Decision—Reversed for IPR2018-01442. U.S. Pat. No. 9,695,751. *Raytheon Technologies Corporation* VS *General Electric Company*.
Singh, Avinash, Load Sharing Behavior in Epicyclic Gears:Physical Explanation and Generalized Formulation. Mechanism and Machine Theory, vol. 45. 2010, 20 pgs.
NASA Lewis Research Center, Quiet Clean Short_Haul Experimental Engine (QCSEE) Main Reduction Gears Detailed Design Final report. NASA CR_134872, Mar. 1975. 222 pgs.
Notice of Opposition from Rolls Royce for Application No. 16159312.4 (Patent No. EP3045684) dated Dec. 14, 2020.
Notice of Opposition from Rolls Royce for Application No. 16174051.9 (Patent No. EP3098396) dated Dec. 14, 2020.
Brief Communication—Summons to attend oral proceedings for Application No. 15777258.3 dated Feb. 1, 2021.

* cited by examiner

FLEXIBLE SUPPORT STRUCTURE FOR A GEARED ARCHITECTURE GAS TURBINE ENGINE

CROSS REFERENCE TO RELATED APPLICATIONS

The present disclosure is a continuation of U.S. patent application Ser. No. 16/125,179 filed Sep. 7, 2018, which is a continuation of U.S. patent application Ser. No. 15/606,494, filed May 26, 2017, now U.S. Pat. No. 10,227,893, issued Mar. 12, 2019, which is a continuation of U.S. patent application Ser. No. 14/859,381, filed Sep. 21, 2015, now U.S. Pat. No. 10,301,968 issued May 28, 2019, which is a continuation of U.S. patent application Ser. No. 14/604,811, filed Jan. 26, 2015, now U.S. Pat. No. 9,239,012 issued Jan. 19, 2016, which is a continuation-in-part of U.S. patent application Ser. No. 13/623,309, filed Sep. 20, 2012, now U.S. Pat. No. 9,133,729, issued Sep. 15, 2015, which is a continuation-in-part of U.S. application Ser. No. 13/342,508, filed Jan. 3, 2012, now U.S. Pat. No. 8,297,916, issued Oct. 30, 2012, which claimed priority to U.S. Provisional Application No. 61/494,453, filed Jun. 8, 2011.

BACKGROUND

The present disclosure relates to a gas turbine engine, and more particularly to a flexible support structure for a geared architecture therefor.

Epicyclic gearboxes with planetary or star gear trains may be used in gas turbine engines for their compact designs and efficient high gear reduction capabilities. Planetary and star gear trains generally include three gear train elements: a central sun gear, an outer ring gear with internal gear teeth, and a plurality of planet gears supported by a planet carrier between and in meshed engagement with both the sun gear and the ring gear. The gear train elements share a common longitudinal central axis, about which at least two rotate. An advantage of epicyclic gear trains is that a rotary input can be connected to any one of the three elements. One of the other two elements is then held stationary with respect to the other two to permit the third to serve as an output.

In gas turbine engine applications, where a speed reduction transmission is required, the central sun gear generally receives rotary input from the powerplant, the outer ring gear is generally held stationary and the planet gear carrier rotates in the same direction as the sun gear to provide torque output at a reduced rotational speed. In star gear trains, the planet carrier is held stationary and the output shaft is driven by the ring gear in a direction opposite that of the sun gear.

During flight, light weight structural cases deflect with aero and maneuver loads causing significant amounts of transverse deflection commonly known as backbone bending of the engine. This deflection may cause the individual sun or planet gear's axis of rotation to lose parallelism with the central axis. This deflection may result in some misalignment at gear train journal bearings and at the gear teeth mesh, which may lead to efficiency losses from the misalignment and potential reduced life from increases in the concentrated stresses.

SUMMARY

A gas turbine engine according to an example of the present disclosure includes a fan shaft configured to drive a fan, a support configured to support at least a portion of the fan shaft, the support defining a support transverse stiffness and a support lateral stiffness, a gear system coupled to the fan shaft, and a flexible support configured to at least partially support the gear system. The flexible support defines a flexible support transverse stiffness with respect to the support transverse stiffness and a flexible support lateral stiffness with respect to the support lateral stiffness. The input defines an input transverse stiffness with respect to the support transverse stiffness and an input lateral stiffness with respect to the support lateral stiffness.

In a further embodiment of any of the forgoing embodiments, the support and the flexible support are mounted to a static structure.

In a further embodiment of any of the forgoing embodiments, the static structure is a front center body of the gas turbine engine.

In a further embodiment of any of the forgoing embodiments, the flexible support is mounted to a planet carrier of the gear system, and the input is mounted to a sun gear of the gear system.

In a further embodiment of any of the forgoing embodiments, the fan shaft is mounted to a ring gear of the gear system.

In a further embodiment of any of the forgoing embodiments, the gear system is a star system.

In a further embodiment of any of the forgoing embodiments, the flexible support is mounted to a ring gear of the gear system, and the input is mounted to a sun gear of the gear system.

In a further embodiment of any of the forgoing embodiments, the fan shaft is mounted to a planet carrier of the gear system.

In a further embodiment of any of the forgoing embodiments, the flexible support transverse stiffness and the input transverse stiffness are both less than the support transverse stiffness.

In a further embodiment of any of the forgoing embodiments, the flexible support transverse stiffness and the input transverse stiffness are each less than about 20% of the support transverse stiffness.

In a further embodiment of any of the forgoing embodiments, the flexible support transverse stiffness and the input transverse stiffness are each less than about 11% of the support transverse stiffness.

In a further embodiment of any of the forgoing embodiments, the input to the gear system is coupled to a turbine section, and the gear system is configured to drive a compressor rotor at a common speed with the fan shaft.

A gas turbine engine according to an example of the present disclosure includes a fan shaft configured to drive a fan, a support configured to support at least a portion of the fan shaft, and a gear system configured to drive the fan shaft. The gear system includes a gear mesh that defines a gear mesh transverse stiffness and a gear mesh lateral stiffness. A flexible support is configured to at least partially support the gear system. The flexible support defines a flexible support transverse stiffness with respect to the gear mesh transverse stiffness and a flexible support lateral stiffness with respect to the gear mesh lateral stiffness. The input defines an input transverse stiffness with respect to the gear mesh transverse stiffness and an input lateral stiffness with respect to the gear mesh lateral stiffness.

In a further embodiment of any of the forgoing embodiments, both the flexible support transverse stiffness and the input transverse stiffness are less than the gear mesh transverse stiffness.

In a further embodiment of any of the forgoing embodiments, the flexible support transverse stiffness is less than about 8% of the gear mesh transverse stiffness, the input transverse stiffness is less than about 5% of the gear mesh transverse stiffness, and a transverse stiffness of a ring gear of the gear system is less than about 20% of the gear mesh transverse stiffness.

In a further embodiment of any of the forgoing embodiments, a transverse stiffness of a planet journal bearing which supports a planet gear of the gear system is less than or equal to the gear mesh transverse stiffness.

In a further embodiment of any of the forgoing embodiments, the support and the flexible support are mounted to a front center body of the gas turbine engine.

A method of designing a gas turbine engine according to an example of the present disclosure includes providing a fan shaft, and providing a support configured to support at least a portion of the fan shaft, the support defining at least one of a support transverse stiffness and a support lateral stiffness, and providing a gear system coupled to the fan shaft. The gear system includes a gear mesh that defines a gear mesh lateral stiffness and a gear mesh transverse stiffness. The method includes providing a flexible support configured to at least partially support the gear system, and providing an input to the gear system. The flexible support defines a flexible support transverse stiffness with respect to the gear mesh transverse stiffness and a flexible support lateral stiffness with respect to the gear mesh lateral stiffness. The input defines an input transverse stiffness with respect to the gear mesh transverse stiffness and an input lateral stiffness with respect to the gear mesh lateral stiffness.

In a further embodiment of any of the forgoing embodiments, the flexible support lateral stiffness is less than the gear mesh lateral stiffness, and the flexible support transverse stiffness is less than the gear mesh transverse stiffness.

In a further embodiment of any of the forgoing embodiments, both the flexible support transverse stiffness and the input transverse stiffness are less than the gear mesh transverse stiffness.

The various features and advantages of this invention will become apparent to those skilled in the art from the following detailed description of an embodiment. The drawings that accompany the detailed description can be briefly described as follows.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
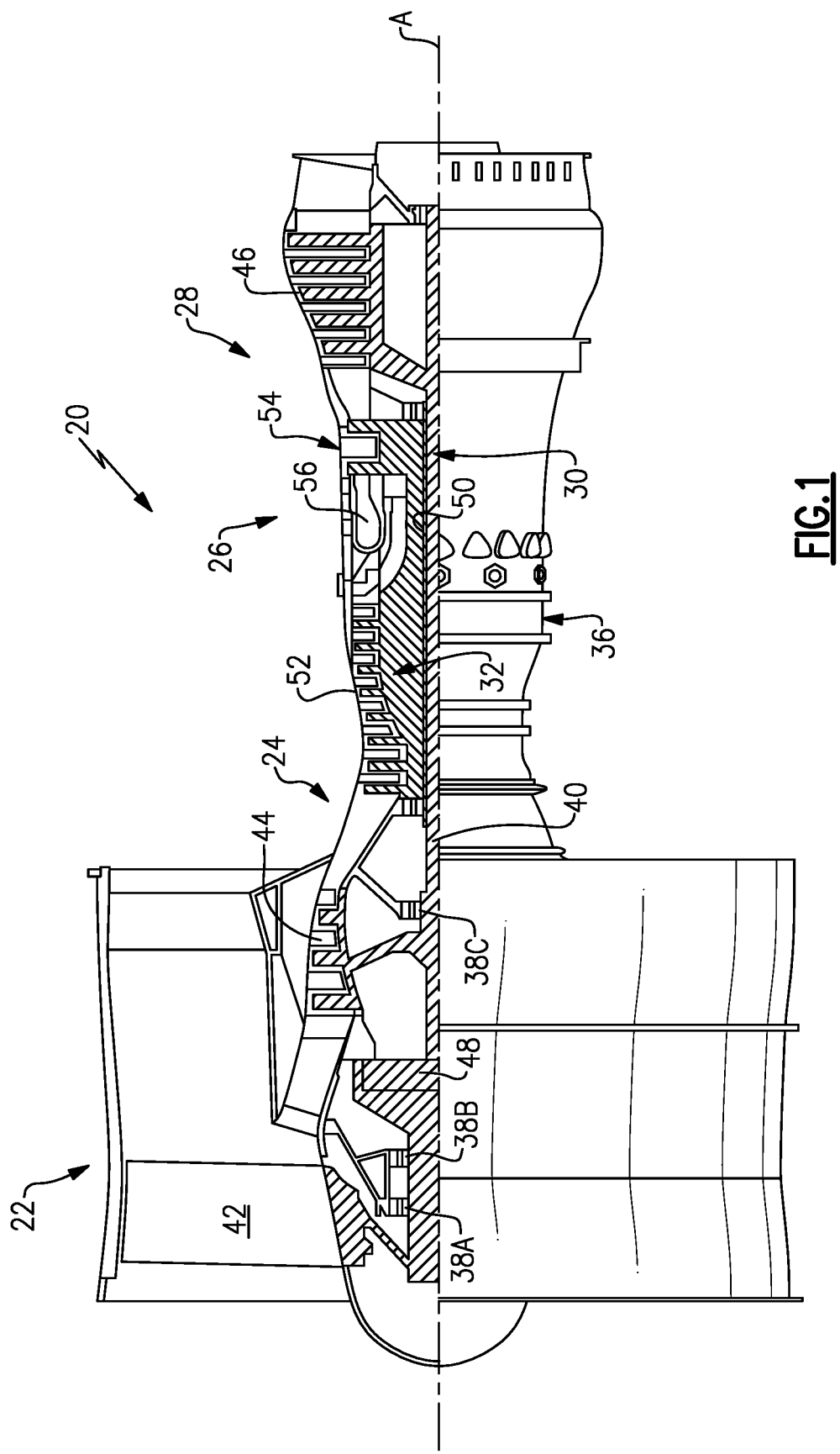
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second.

Figure 2:
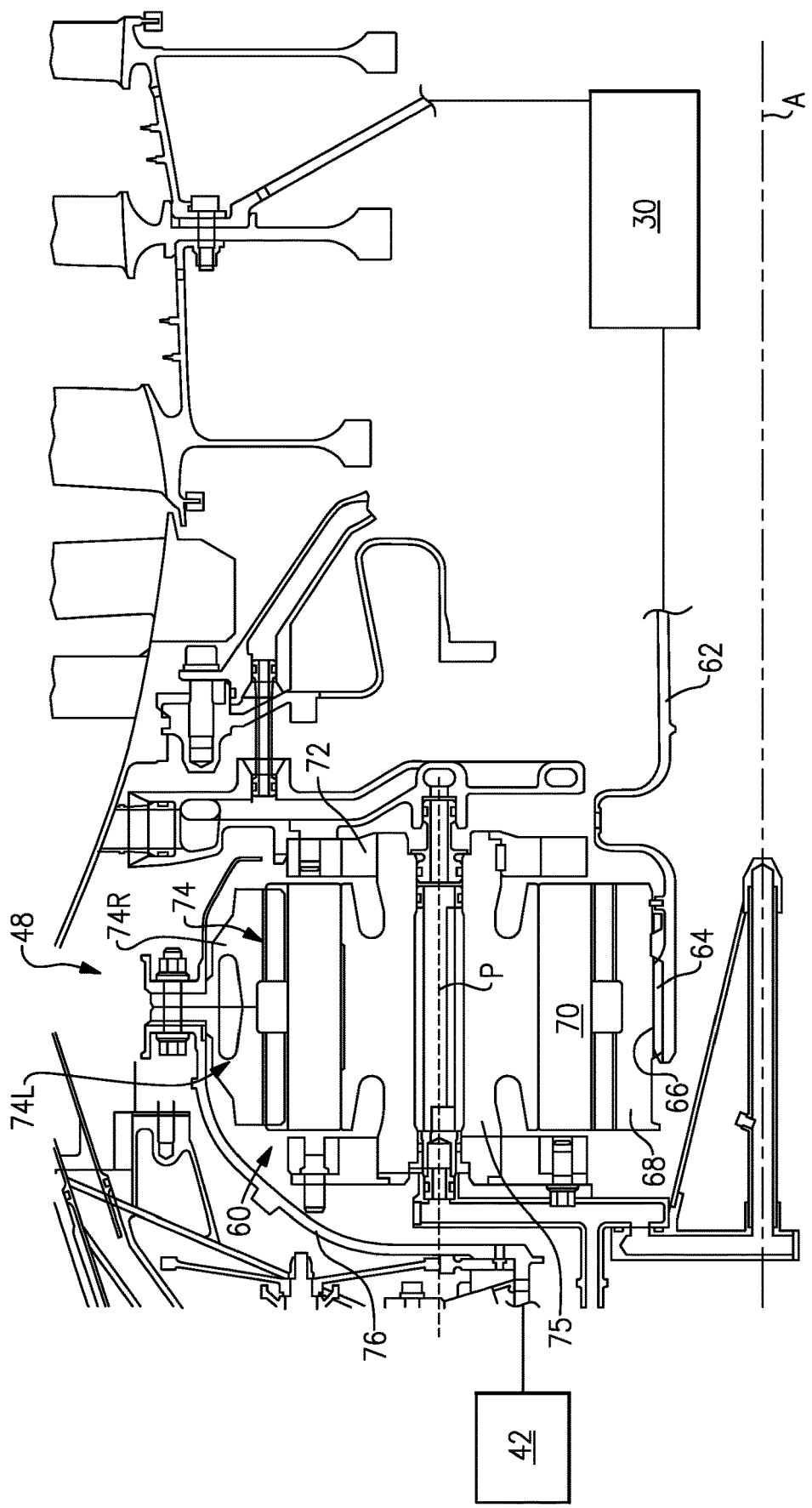
FIG. 2 is an enlarged cross-section of a section of the gas turbine engine which illustrates a fan drive gear system (FDGS)

With reference to FIG. 2, the geared architecture 48 generally includes a fan drive gear system (FDGS) 60 driven by the low speed spool 30 (illustrated schematically) through an input 62. The input 62, which may be in the form of a coupling, both transfers torque from the low speed spool 30 to the geared architecture 48 and facilitates the segregation of vibrations and other transients therebetween. In the disclosed non-limiting embodiment, the FDGS 60 may include an epicyclic gear system which may be, for example, a star system or a planet system.

The input coupling 62 may include an interface spline 64 joined, by a gear spline 66, to a sun gear 68 of the FDGS 60. The sun gear 68 is in meshed engagement with multiple planet gears 70, of which the illustrated planet gear 70 is representative. Each planet gear 70 is rotatably mounted in a planet carrier 72 by a respective planet journal bearing 75. Rotary motion of the sun gear 68 urges each planet gear 70 to rotate about a respective longitudinal axis P.

Each planet gear 70 is also in meshed engagement with rotating ring gear 74 that is mechanically connected to a fan shaft 76. Since the planet gears 70 mesh with both the rotating ring gear 74 as well as the rotating sun gear 68, the planet gears 70 rotate about their own axes to drive the ring gear 74 to rotate about engine axis A. The rotation of the ring gear 74 is conveyed to the fan 42 (FIG. 1) through the fan shaft 76 to thereby drive the fan 42 at a lower speed than the low speed spool 30. It should be understood that the described geared architecture 48 is but a single non-limiting embodiment and that various other geared architectures will alternatively benefit herefrom.

Figure 3:
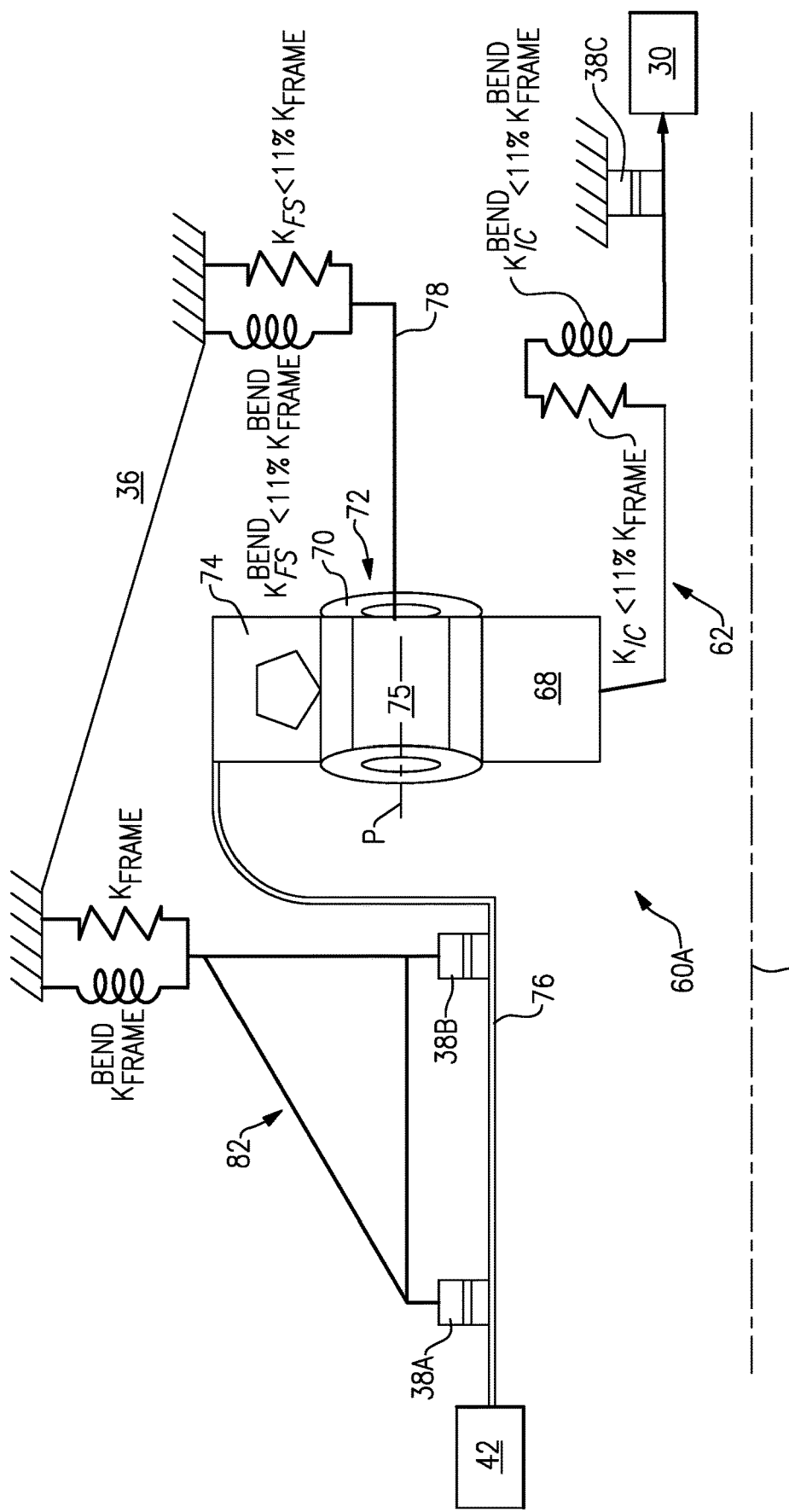
FIG. 3 is a schematic view of a flex mount arrangement for one non-limiting embodiment of the FDGS.

With reference to FIG. 3, a flexible support 78 supports the planet carrier 72 to at least partially support the FDGS 60A with respect to the static structure 36 such as a front center body which facilitates the segregation of vibrations and other transients therebetween. It should be understood that various gas turbine engine case structures may alternatively or additionally provide the static structure and flexible support 78. It should be understood that lateral as defined herein is generally transverse to the axis of rotation A and the term "transverse" refers to a pivotal bending movement with respect to the axis of rotation A which typically absorbs deflection applied to the FDGS 60. The static structure 36 may further include a number 1 and 1.5 bearing support static structure 82 which is commonly referred to as a "K-frame" which supports the number 1 and number 1.5 bearing systems 38A, 38B. Notably, the K-frame bearing support defines a lateral stiffness (represented as Kframe in FIG. 3) and a transverse stiffness (represented as $Kframe^{BEND}$ in FIG. 3) as the referenced factors in this non-limiting embodiment.

In this disclosed non-limiting embodiment, the lateral stiffness (KFS; KIC) of both the flexible support 78 and the input coupling 62 are each less than about 11% of the lateral stiffness (Kframe). That is, the lateral stiffness of the entire FDGS 60 is controlled by this lateral stiffness relationship. Alternatively, or in addition to this relationship, the transverse stiffness of both the flexible support 78 and the input coupling 62 are each less than about 11% of the transverse stiffness ($Kframe^{BEND}$). That is, the transverse stiffness of the entire FDGS 60 is controlled by this transverse stiffness relationship.

Figure 4:
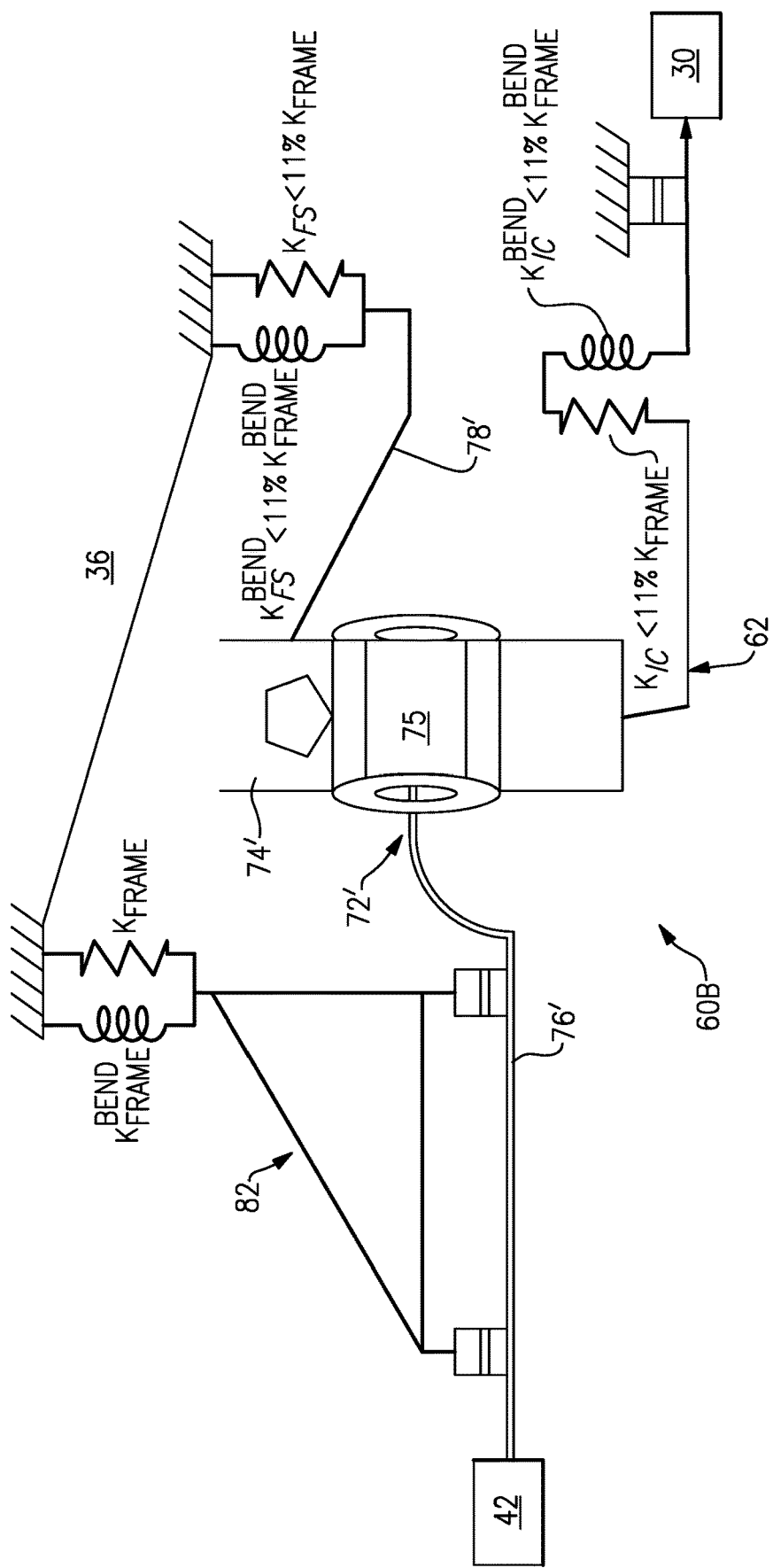
FIG. 4 is a schematic view of a flex mount arrangement for another non-limiting embodiment of the FDGS.

With reference to FIG. 4, another non-limiting embodiment of a FDGS 60B includes a flexible support 78' that supports a rotationally fixed ring gear 74'. The fan shaft 76' is driven by the planet carrier 72' in the schematically illustrated planet system which otherwise generally follows the star system architecture of FIG. 3.

Figure 5:
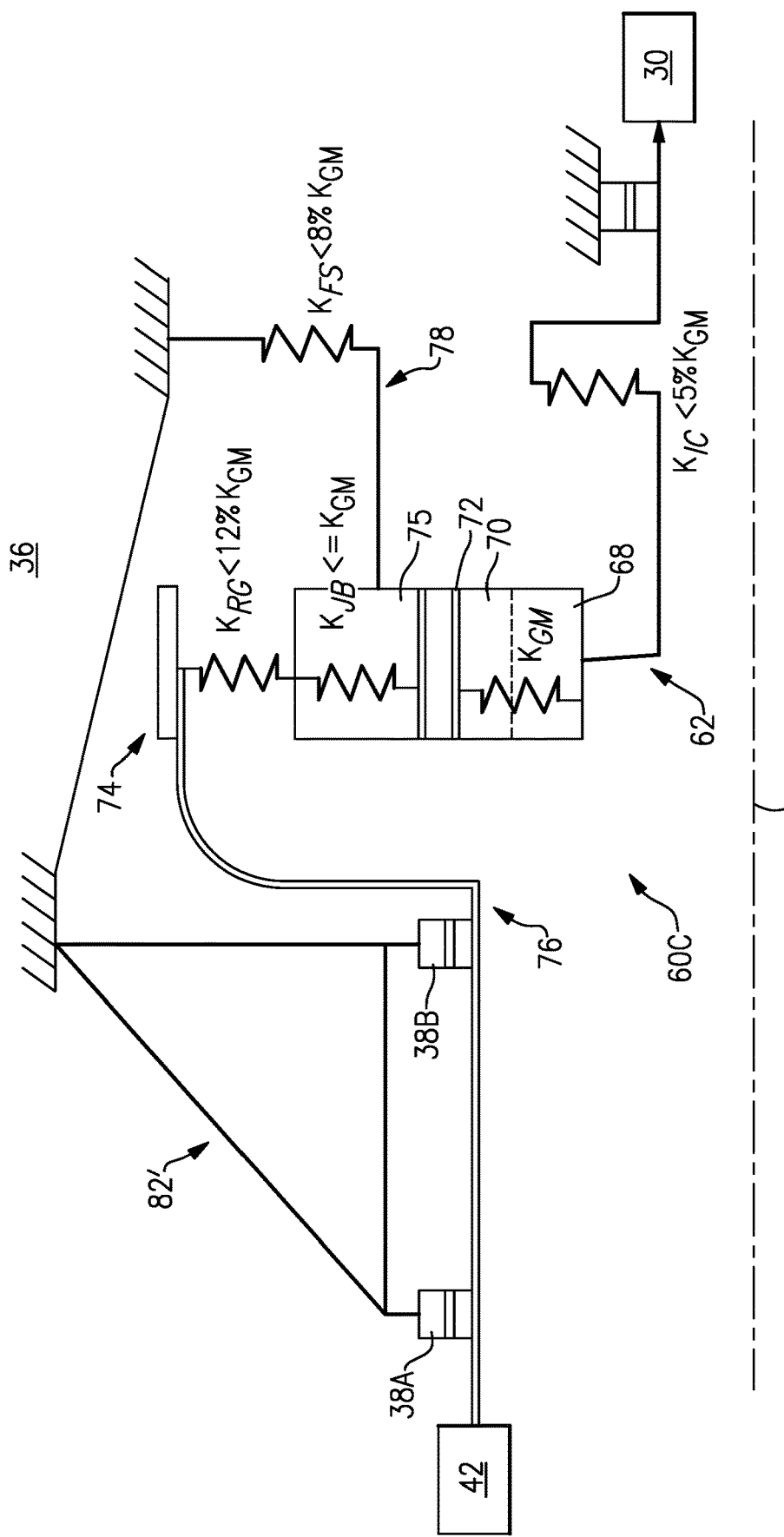
FIG. 5 is a schematic view of a flex mount arrangement for another non-limiting embodiment of a star system FDGS.

With reference to FIG. 5, the lateral stiffness relationship within a FDGS 60C itself (for a star system architecture) is schematically represented. The lateral stiffness (KIC) of an input coupling 62, a lateral stiffness (KFS) of a flexible support 78, a lateral stiffness (KRG) of a ring gear 74 and a lateral stiffness (KJB) of a planet journal bearing 75 are controlled with respect to a lateral stiffness (KGM) of a gear mesh within the FDGS 60.

In the disclosed non-limiting embodiment, the stiffness (KGM) may be defined by the gear mesh between the sun gear 68 and the multiple planet gears 70. The lateral stiffness (KGM) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The lateral stiffness (KJB) may be mechanically defined by, for example, the stiffness within the planet journal bearing 75 and the lateral stiffness (KRG) of the ring gear 74 may be mechanically defined by, for example, the geometry of the ring gear wings 74L, 74R (FIG. 2).

In the disclosed non-limiting embodiment, the lateral stiffness (KRG) of the ring gear 74 is less than about 12% of the lateral stiffness (KGM) of the gear mesh; the lateral stiffness (KFS) of the flexible support 78 is less than about 8% of the lateral stiffness (KGM) of the gear mesh; the lateral stiffness (KJB) of the planet journal bearing 75 is less than or equal to the lateral stiffness (KGM) of the gear mesh; and the lateral stiffness (KIC) of an input coupling 62 is less than about 5% of the lateral stiffness (KGM) of the gear mesh.

Figure 6:
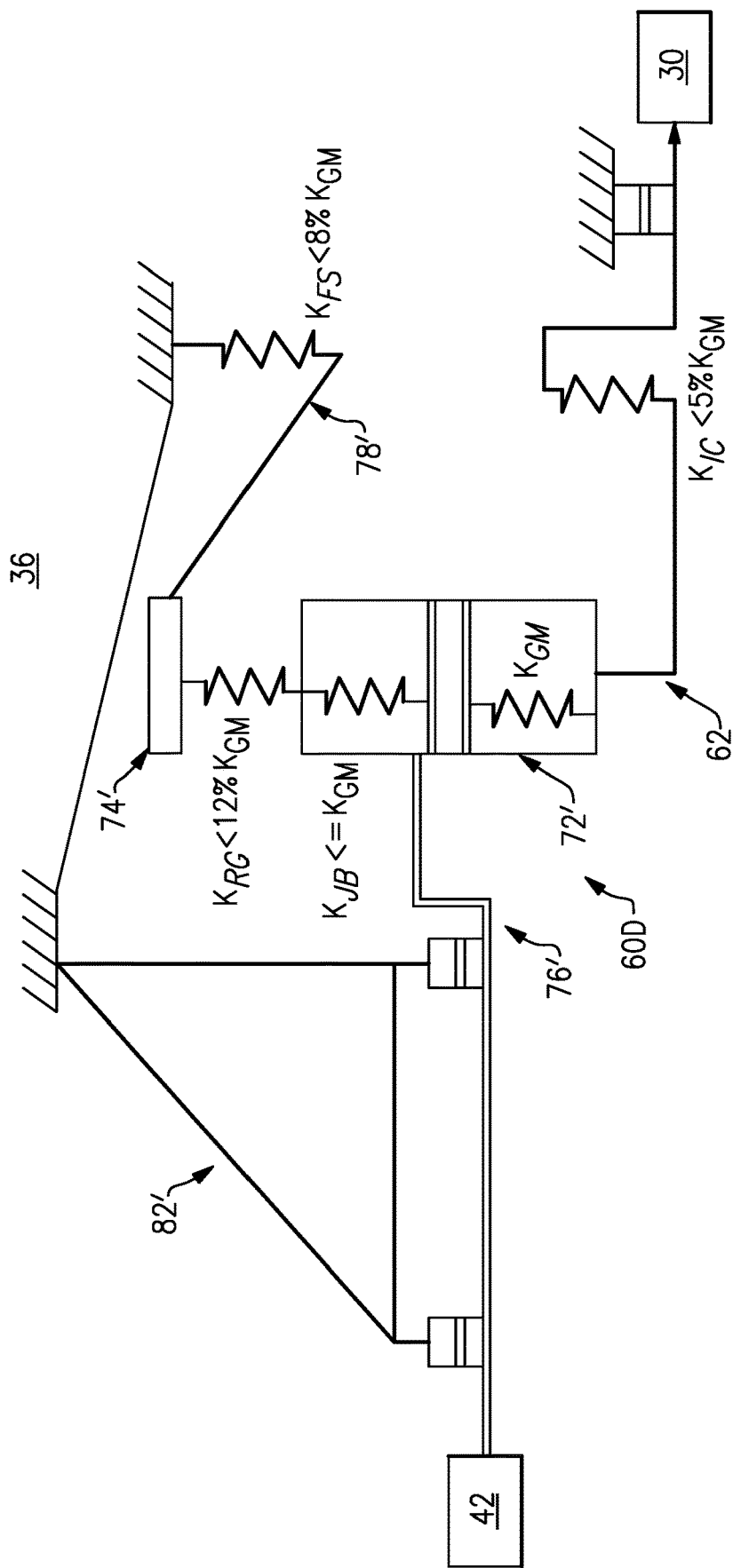
FIG. 6 is a schematic view of a flex mount arrangement for another non-limiting embodiment of a planetary system FDGS.

With reference to FIG. 6, another non-limiting embodiment of a lateral stiffness relationship within a FDGS 60D itself are schematically illustrated for a planetary gear system architecture, which otherwise generally follows the star system architecture of FIG. 5.

It should be understood that combinations of the above lateral stiffness relationships may be utilized as well. The lateral stiffness of each of structural components may be readily measured as compared to film stiffness and spline stiffness which may be relatively difficult to determine.

By flex mounting to accommodate misalignment of the shafts under design loads, the FDGS design loads have been reduced by more than 17% which reduces overall engine weight. The flex mount facilitates alignment to increase system life and reliability. The lateral flexibility in the flexible support and input coupling allows the FDGS to essentially 'float' with the fan shaft during maneuvers. This allows: (a) the torque transmissions in the fan shaft, the input coupling and the flexible support to remain constant during maneuvers; (b) maneuver induced lateral loads in the fan shaft (which may otherwise potentially misalign gears and damage teeth) to be mainly reacted to through the number 1 and 1.5 bearing support K-frame; and (c) both the flexible support and the input coupling to transmit small amounts of lateral loads into the FDGS. The splines, gear tooth stiffness, journal bearings, and ring gear ligaments are specifically designed to minimize gear tooth stress variations during maneuvers. The other connections to the FDGS are flexible mounts (turbine coupling, case flex mount). These mount spring rates have been determined from analysis and proven in rig and flight testing to isolate the gears from engine maneuver loads. In addition, the planet journal bearing spring rate may also be controlled to support system flexibility.

Figure 7:
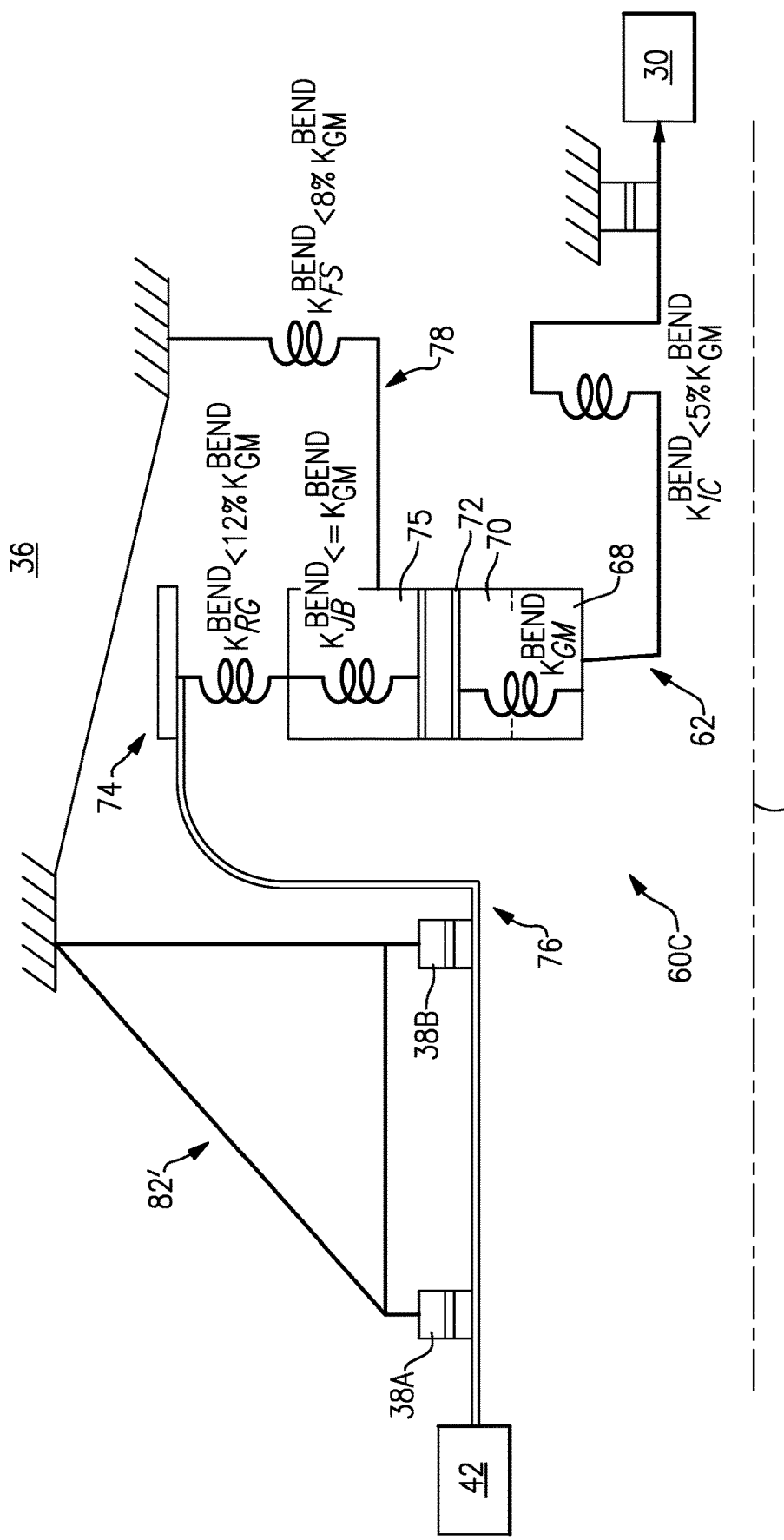
FIG. 7 is a schematic view of a flex mount arrangement for another non-limiting embodiment of a star system FDGS.

FIG. 7 is similar to FIG. 5 but shows the transverse stiffness relationships within the FDGS 60C (for a star system architecture). The transverse stiffness ($KIC^{BEND}$) of the input coupling 62, a transverse stiffness ($KFS^{BEND}$) of the flexible support 78, a transverse stiffness ($KRG^{BEND}$) of the ring gear 74 and a transverse stiffness ($KJB^{BEND}$) of the planet journal bearing 75 are controlled with respect to a transverse stiffness ($KGM^{BEND}$) of the gear mesh within the FDGS 60.

In the disclosed non-limiting embodiment, the stiffness ($KGM^{BEND}$) may be defined by the gear mesh between the sun gear 68 and the multiple planet gears 70. The transverse stiffness ($KGM^{BEND}$) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The transverse stiffness ($KJB^{BEND}$) may be mechanically defined by, for example, the stiffness within the planet journal bearing 75 and the transverse stiffness ($KRG^{BEND}$) of the ring gear 74 may be mechanically defined by, for example, the geometry of the ring gear wings 74L, 74R (FIG. 2).

In the disclosed non-limiting embodiment, the transverse stiffness ($KRG^{BEND}$) of the ring gear 74 is less than about 12% of the transverse stiffness ($KGM^{BEND}$) of the gear mesh; the transverse stiffness ($KFS^{BEND}$) of the flexible support 78 is less than about 8% of the transverse stiffness ($KGM^{BEND}$) of the gear mesh; the transverse stiffness ($KJB^{BEND}$) of the planet journal bearing 75 is less than or equal to the transverse stiffness ($KGM^{BEND}$) of the gear mesh; and the transverse stiffness ($KIC^{BEND}$) of an input coupling 62 is less than about 5% of the transverse stiffness ($KGM^{BEND}$) of the gear mesh.

Figure 8:
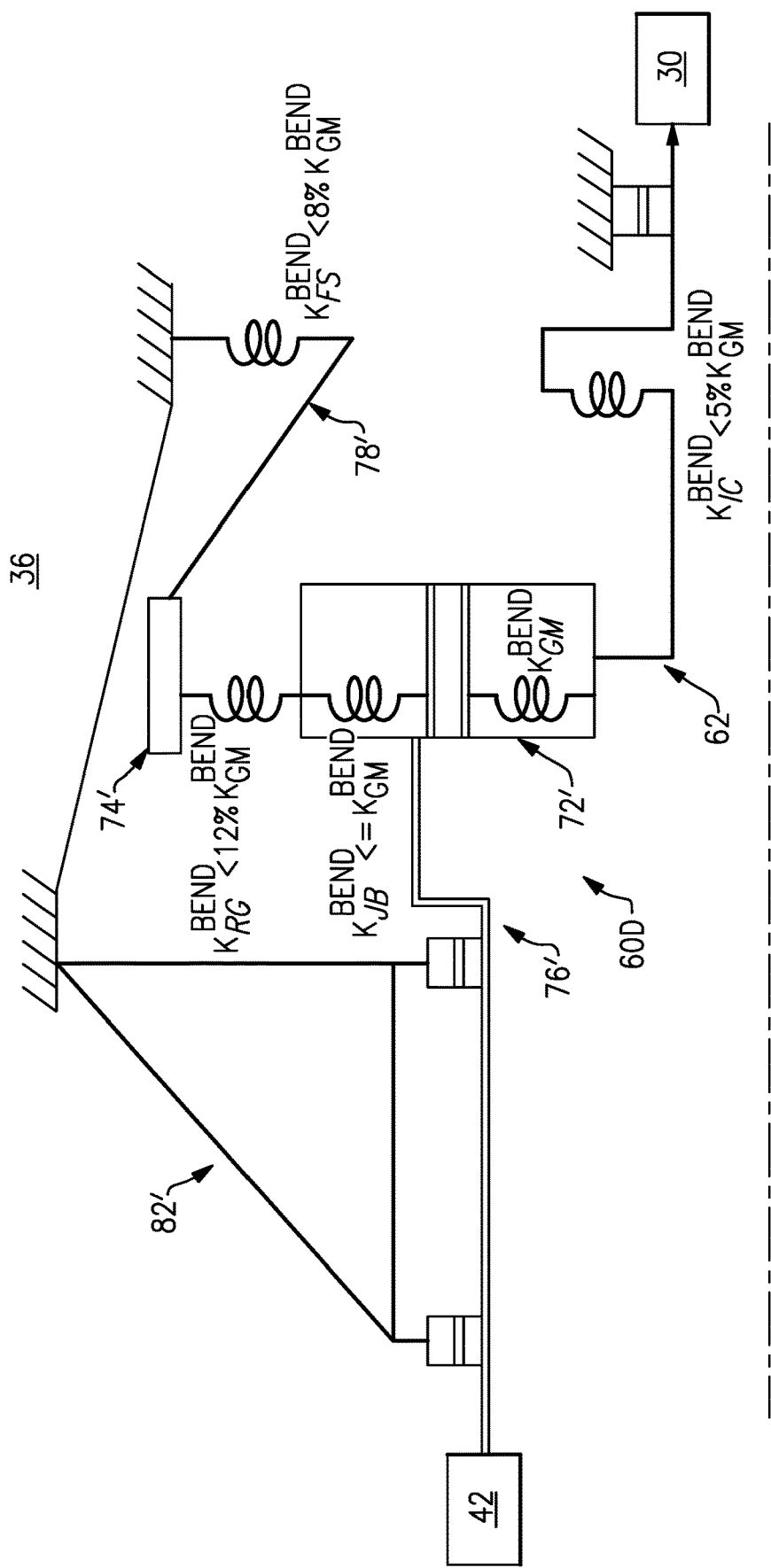
FIG. 8 is a schematic view of a flex mount arrangement for another non-limiting embodiment of a planetary system FDGS.

FIG. 8 is similar to FIG. 6 but shows the transverse stiffness relationship within the FDGS 60D for the planetary gear system architecture.

Figure 9:
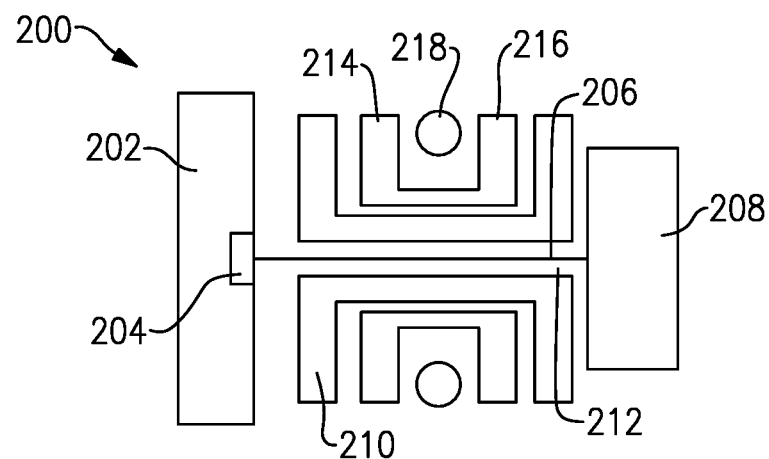
FIG. 9 shows another embodiment.

FIG. 9 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured, mounted and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 10:
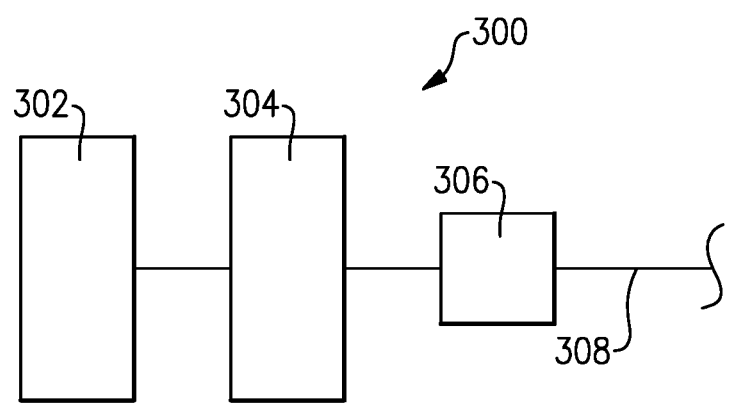
FIG. 10 shows yet another embodiment.

FIG. 10 shows yet another embodiment 300 wherein a fan rotor 302 and a first stage compressor 304 rotate at a common speed. The gear reduction 306 (which may be structured, mounted and operate as disclosed above) is intermediate the compressor rotor 304 and a shaft 308, which is driven by a low pressure turbine section.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine, comprising:

a fan shaft driving a fan having fan blades;

an outer housing surrounding the fan, and a bypass flow path within said outer housing;

a fan shaft support that supports said fan shaft, said fan shaft support defining a fan shaft support transverse stiffness;

a gear system connected to said fan shaft, said gear system includes a gear mesh defining a gear mesh transverse stiffness; and a flexible support which supports said gear system relative to a static structure and defines a flexible support transverse stiffness, wherein said flexible support transverse stiffness is less than 11% of said fan shaft support transverse stiffness and said flexible support transverse stiffness is less than 8% of said gear mesh transverse stiffness.

2. The gas turbine engine of claim 1, wherein said fan shaft support defines a fan shaft support lateral stiffness and said flexible support defines a flexible support lateral stiffness and said flexible support lateral stiffness is less than 11% of said fan shaft support lateral stiffness.

3. The gas turbine engine of claim 2, further comprising a fan section having a low fan pressure ratio of less than 1.45, wherein said low fan pressure ratio is measured across the fan blades alone.

4. The gas turbine engine of claim 3, further comprising a low corrected fan tip speed less than 1150 ft/second, wherein said low corrected fan tip speed is an actual fan tip speed at an ambient temperature divided by $[(T_{ram} °R)/(518.7 °R)]^{0.5}$, where T represents said ambient temperature in degrees Rankine.

5. The gas turbine engine of claim 4, further comprising a mid-turbine frame including at least one airfoil extending into a flow path, and wherein said fan shaft support is a K-frame bearing support.

6. The gas turbine engine of claim 3, and a reduction ratio greater than 2.3.

7. The gas turbine engine of claim 6, wherein said gear mesh defines a gear mesh lateral stiffness and said flexible support lateral stiffness is less than 8% of said gear mesh lateral stiffness.

8. The gas turbine engine of claim 7, further comprising a high speed spool including a two stage high pressure turbine, and a low speed spool including a low pressure turbine with an inlet, an outlet, and a low pressure turbine pressure ratio greater than 5:1, wherein said low pressure turbine pressure ratio is a ratio of a pressure measured prior to said inlet as related to a pressure at said outlet prior to any exhaust nozzle.

9. The gas turbine engine of claim 8, further comprising a two stage high pressure turbine, and a low corrected fan tip speed less than 1150 ft/second, wherein said low corrected fan tip speed is an actual fan tip speed at an ambient temperature divided by $[(Tram °R)/(518.7 °R)]0.5$, where T represents said ambient temperature in degrees Rankine.

10. The gas turbine engine of claim 7, further comprising an input coupling defining an input coupling transverse stiffness, wherein said input coupling transverse stiffness is less than 20% of said fan shaft support transverse stiffness.

11. The gas turbine engine of claim 10, wherein said input coupling transverse stiffness is less than 11% of said fan shaft support transverse stiffness.

12. The gas turbine engine of claim 11, wherein said input coupling defines an input coupling lateral stiffness and said input coupling lateral stiffness is less than 11% of said fan shaft support lateral stiffness.

13. The gas turbine engine of claim 10, wherein said input coupling defines an input coupling lateral stiffness and said input coupling lateral stiffness is less than 11% of said fan shaft support lateral stiffness.

14. The gas turbine engine of claim 3, further comprising a low corrected fan tip speed less than 1150 ft/second, wherein said low corrected fan tip speed is an actual fan tip speed at an ambient temperature divided by $[(T_{ram} °R)/(518.7 °R)]^{0.5}$, where T represents said ambient temperature in degrees Rankine, and further comprising at least one bearing system, a high speed spool including an outer shaft and a low speed spool including an inner shaft, wherein said gear system includes a planet carrier and said fan shaft is mounted to said planet carrier and said inner shaft and outer shaft are concentric and rotate via said at least one bearing system about a longitudinal axis of said engine.

15. A gas turbine engine, comprising:
a fan shaft driving a fan having fan blades;
an outer housing surrounding the fan, and a bypass flow path within said outer housing;
a fan shaft support that supports said fan shaft, said fan shaft support defining a fan shaft support transverse stiffness;
a gear system connected to said fan shaft, said gear system includes a gear mesh defining a gear mesh lateral stiffness;
at least one bearing system, a high speed spool including an outer shaft and a low speed spool including an inner shaft, wherein said gear system includes a planet carrier and said fan shaft is mounted to said planet carrier and said inner shaft and outer shaft are concentric and rotate via said at least one bearing system about a longitudinal axis of said engine; and
a flexible support which supports said gear system relative to a static structure and defines a flexible support transverse stiffness and a flexible support lateral stiffness, wherein said flexible support transverse stiffness is less than 11% of said fan shaft support transverse stiffness, and said flexible support lateral stiffness is less than 8% of said gear mesh lateral stiffness.

16. The gas turbine engine of claim 15, wherein said gear mesh defines a gear mesh transverse stiffness and said flexible support transverse stiffness is less than 8% of said gear mesh transverse stiffness.

17. The gas turbine engine of claim 16, further comprising a low pressure turbine driving said gear system having an inlet, an outlet, and a low pressure turbine pressure ratio greater than 5:1, wherein said low pressure turbine pressure ratio is a ratio of a pressure measured prior to said inlet as related to a pressure at said outlet prior to an exhaust nozzle.

18. The gas turbine engine of claim 17, further comprising a low corrected fan tip speed less than 1150 ft/second, wherein said low corrected fan tip speed is an actual fan tip speed at an ambient temperature divided by $[(T_{ram} °R)/(518.7 °R)]^{0.5}$, where T represents said ambient temperature in degrees Rankine.

19. The gas turbine engine of claim 18, wherein said gear system drives a compressor rotor at a common speed with said fan shaft.

20. The gas turbine engine of claim 19, further comprising a three stage low pressure compressor, and a two stage high pressure turbine.

21. The gas turbine engine of claim 15, further comprising a fan section having a low fan pressure ratio of less than 1.45, said low fan pressure ratio measured across the fan blades alone and a reduction ratio greater than 2.3.

22. The gas turbine engine of claim 21, further comprising a low corrected fan tip speed less than 1150 ft/second, wherein said low corrected fan tip speed is an actual fan tip speed at an ambient temperature divided by $[(T_{ram} °R)/(518.7 °R)]^{0.5}$, where T represents said ambient temperature in degrees Rankine.

23. The gas turbine engine of claim 22, further comprising a mid-turbine frame including at least one airfoil extending into a flow path.

24. The gas turbine engine of claim 22, further comprising an input coupling defining an input coupling transverse stiffness, wherein said input coupling transverse stiffness is less than 11% of said fan shaft support transverse stiffness.

25. The gas turbine engine of claim 24, wherein said input coupling both transfers torque and facilitates the segregation of vibrations.

26. The gas turbine engine of claim 21, further comprising an input coupling defining an input coupling transverse stiffness, wherein said input coupling transverse stiffness is less than 20% of said fan shaft support transverse stiffness.

27. The gas turbine engine of claim 26, further comprising said input coupling defining an input coupling lateral stiffness and said fan shaft support defining a fan shaft support lateral stiffness, wherein said input coupling lateral stiffness is less than 11% of said fan shaft support lateral stiffness.

28. The gas turbine engine of claim 27, wherein said input coupling transverse stiffness is less than 11% of said fan shaft support transverse stiffness.

\* \* \* \* \*